US006616455B1

(12) United States Patent
Allen, Sr.

(10) Patent No.: US 6,616,455 B1
(45) Date of Patent: Sep. 9, 2003

(54) INSTRUCTIONAL METHOD

(75) Inventor: Earl E. Allen, Sr., Pearland, TX (US)

(73) Assignee: Miracle Publications International, Inc., Pearland, TX (US)

( * ) Notice: Subject to any disclaimer, the term of this patent is extended or adjusted under 35 U.S.C. 154(b) by 0 days.

(21) Appl. No.: 09/666,871

(22) Filed: Sep. 20, 2000

(51) Int. Cl.$^7$ ............................................. G09B 19/00
(52) U.S. Cl. ....................... 434/245; 434/128; 434/322; 273/430
(58) Field of Search ............................... 434/322, 245, 434/236, 237, 238, 128, 107, 327, 332, 129; 273/429, 430, 431

(56) References Cited

U.S. PATENT DOCUMENTS

| | | | |
|---|---|---|---|
| 4,201,388 A | 5/1980 | Cantelon | 273/251 |
| 4,934,709 A | 6/1990 | Peterson | 273/249 |
| 5,152,535 A | 10/1992 | Roberts | 273/249 |
| 5,221,094 A | 6/1993 | Hanson | 273/431 |
| 5,224,862 A | 7/1993 | Sullivan | 434/129 |
| 5,295,834 A | 3/1994 | Saunders | 434/128 |
| 5,377,991 A | 1/1995 | Olsen | 273/249 |
| 5,449,177 A | 9/1995 | Naylor | 273/236 |
| 5,454,569 A | 10/1995 | Walker | 273/236 |
| 5,529,308 A | 6/1996 | Masakayan | 273/243 |
| 5,607,160 A | 3/1997 | Stevens et al. | 273/249 |
| 5,660,389 A | 8/1997 | Freda, III | 273/249 |
| 5,743,528 A | 4/1998 | Downey-Jerome | 273/249 |
| 5,820,125 A | 10/1998 | Olsen | 273/248 |
| 5,876,211 A | * 3/1999 | Schmoyer et al. | 273/243 |
| 5,934,910 A | 8/1999 | Ho et al. | 434/362 |
| 5,947,742 A | 9/1999 | Katayama | 434/247 |
| 5,957,698 A | 9/1999 | Dean et al. | 434/350 |
| 5,980,263 A | * 11/1999 | Conover | 434/178 |
| 6,015,947 A | 1/2000 | Moberg | 84/471 |
| 6,120,296 A | * 9/2000 | Lim | 273/292 |

OTHER PUBLICATIONS

*Situating Teaching Practices in the Past and Present;* [online]. Retrieved from the Internet:<URL: http://cleo.murdoch.edu.au/waier/forums/1999/dobozy.html.
Bruner, J.; *Overview;* [online]. Retrieved from the Internet:<URL: http://www.gwu.edu/~tip/bruner.html.
Miller, J., Wilkes, J., Cheetham, R. and Goodwin, L.; *Gordon's Cognitive Style Typology* [online]. Retrieved from the Internet:<URL: http://www.wpi.edu/~isg 501/nsushkin–th.html.
*How Children Learn* [online]. Retrieved from the Internet:<URL: http://129.7.160.115/inst5931/PIAGET1.html.
[online]. Retrieved from the Internet:<URL: http://www.pdkintl.org/kappan/keis9905.htm.
*Learning: Current Theories,* [online]. Retrieved from the Internet:<URL: http://www.cs.colorado.edu/~13d/presentations/gh–wlf/.
*Learning Theory Fundamentals* [online]. Retrieved from the Internet:<URL: http://coe.sdsu.edu/eet/Articles/learntheory/start.htm.
[online]. Retrieved from the Internet:<URL: http://mason.gmu.edu/~ldines/PORTFOLIO/finalpaper.htm.
[online]. Retrieved from the Internet:<URL: http://bobcat.oursc.k12.ar.us/~jdharris/cogmem.html.
*Empiricism* [online]. Retrieved from the Internet:<URL: http://www.encyclopedia.com/articles/04099.html.
[online]. Retrieved from the Internet:<URL: http://www.infoplease.com/ce6/sci/A0805082.html.
*Philosophical Roots* [online]. Retrieved from the Internet:<URL: http://www.icsi.berkeley.edu/~jagota/NCS/VOL1/P3_html/node6.html.
*Core Knowledge* [online]. [retrieved on Sep. 13, 2000]. Retrieved from the Internet:<URL: http://www.aasa.org/Reform/Approach/corknow.htm.
*Direct Instruction* [online]. [retrieved on Sep. 13, 2000]. Retrieved from the Internet:<URL: http://www.aasa.org/Reform/Approach/direct.htm.
Dewey, John. Encarta Encyclopedia [online] [retrieved on Jun. 30, 2000]. Retrieved from the Internet:<URL: http://encarta.msn.com/find/print.asp?&pg=8?ti=761566854&sc=0&pt=1.
*Associationism,* Encarta Encyclopedia [online]. [retrieved on Jun. 30, 2000]. Retrieved from the Internet:<URL: http://encarta.msn.com/find/print,asp?&pg=8&ti=761553239&sc=0&pt=1.
*Functionalism (psychology)* Encyclopedia [online], [retrieved on Jun. 30, 2000]. Retrieved from the Internet:<URL: http://encarta.msn.com/find/print.asp?&pg=8&ti=761553131&sc=0&pt=1.
*Psychology;* Encarta Encyclopedia [online]. [retrieved on Jun. 30, 2000]. Retrieved from the Internet:<URL: http://encarta.msn.com/find/print.asp?&pg=8&ti=761576533&sc=7&pt=1.
*Behaviorism* [online]. [retrieved from Jun. 30, 2000]. Retrieved from the Internet:<URL: http://encarta.msn.com/find/concise.asp?ti=761551503&sid=3.
Skinner, B. F. Encarta Encyclopedia [online] [retrieved on Jun. 30, 2000]. Retrieved from the Internet:URL: http://encarta.msn.com/find/Concise.asp?z=1&pg=2&ti=761563008.
[online]. Retrieved from the Internet:<URL: http://edweb.sdsu.edu/course/edtec540/Perspectives/Perspective.html.
[online]. Retrieved from the Internet:<URL: http://objectivistcenter.org/pubs/F Montes.asp.
[online]. Retrieved from the Internet:<URL: http://www.uib.no/People/Sinia/CSCL/CSCL java/doc/web struktur–836.htm.
Conway, Judith; *Educational Technology's Effect on Models of Instruction;* [online], May 1997; Retrieved from the Internet: <URL: http://copeland.udel.edu/~jconway/EDST666.htm#cogapp.

\* cited by examiner

Primary Examiner—Kien T. Nguyen
(74) Attorney, Agent, or Firm—Conley Rose, P.C.

(57) ABSTRACT

An instructional method is provided which includes presenting instructional material, allowing students to discuss the material, and allowing the students to participate in a game related to the material. The instructional material is preferably self-contained. The method may be used by teachers and students without prior preparation. The game preferably includes a rule that each student remains in the game until completion. The instructional method allows children, youth, and adults to learn the instructional material quickly and easily. The instructional material may be on any subject. Preferably, the instructional material relates to the Bible.

32 Claims, No Drawings

INSTRUCTIONAL METHOD

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to an instructional method. More particularly, the invention relates to an instructional method that involves teaching instructional material through integration of a presentation of the material, a small group discussion related to the material, and a game related to the material.

2. Description of the Related Art

It is well established that typically in the life of a person, a child or an adult, an occasion arises for learning new information. Usually the person who needs or desires to learn, the student, has direction and assistance from another person, the teacher, such as a classroom teacher, an individual tutor, a facilitator, or the like. A variety of approaches to teaching have been practiced in the United States, based on differing interpretations of the respective roles of teacher and student.

In a conventional method of instruction, the teacher follows an approach based on a behaviorist interpretation of education, such as an approach based on the theory popularized by B. F. Skinner. A behaviorist approach focuses on a new behavior pattern being repeated until it becomes automatic. As applied to education, Skinner taught a method in which the teacher modifies the behavior of a student by setting up situations to reinforce the student when he or she exhibits desired responses. In this method, learning is viewed as a sequence of steps of stimulus action by the teacher and corresponding response action in the student. The teacher transmits each skill necessary to lead up to the desired behavior step by step and reinforces the student in learning each skill in the prescribed order. Thus the teacher provides a mechanism for the student to link together responses involving lower level skills and build on them to attain higher level skills. While providing a high degree of structure, this method has the disadvantage that it tends to be reliant on the teacher for implementation, it is sequential, and it relies on prior knowledge on the part of the student.

In an alternative method of instruction, the teacher follows an approach based on a cognitive interpretation of education, such as those based on work chosen from that of John Dewey, Lev Vygotsky, and Maria Montessori, among others. Cognitivism includes recognition of the thought process behind a behavior. Thus, a cognitive approach focuses on learning as a process that depends on the student's prior knowledge and experience and the way new information is presented to the student. Learning proceeds in stages and the teaching method emphasizes guiding the student through developmentally appropriate tasks. For example, Vygotsky introduced the notion that all learning takes place in the "zone of proximal development". Similarly, Montessori introduced a method in which the teacher, called a director, guides individual students in progressing through self-paced structured learning from direct experiences. The Montessori method includes supporting the individual and facilitating early development of the intellect. Further, Dewey introduced a method, commonly called the progressive method, in which teachers assist students in learning through varied activities and which includes fostering the imagination, facilitating the development of social relationships, and supporting collective learning. Although allowing for less structure and more student involvement than typical behaviorist methods, these cognitive methods share the disadvantage of requiring sequential learning.

In still another method of instruction, the teacher follows an approach based on a constructivist interpretation of education, such as an approach based on the theory of Jerome Bruner, or Jean Piaget, among others. Constructivism asserts that a student constructs an individual perspective of the world, so that learned knowledge includes a subjective, personal element. This is in contrast to methods, such as those described above, in which the student is viewed as having an "absorbent mind," receiving fixed knowledge that is primarily objective, not varying from student to student. For example, Piaget, who founded the constructivist theory, claimed that learning involves active engagement in which meaning is created from experience, such as when a child acts on an object. The teacher transmits knowledge and facilitates the construction of the knowledge by the student. Similarly, Bruner introduced a method called discovery learning, in which the teacher translates the information to be learned into a format appropriate to the student's current state of understanding, structuring knowledge so that it is readily grasped by the student, and presenting the information sequentially. In turn, the student constructs new information based upon the student's state of prior knowledge. Although these methods prepare students to solve problems in ambiguous situations, they have the disadvantage that they are susceptible to a lack of standardization.

Despite the array of educational options available, United States K-12 students are falling behind. Assessing the state of education in the United States, *A Nation at Risk, published in* 1983, presented the conclusions of the National Commission on Excellence in Teaching that was appointed by Secretary of Education T. H. Bell in 1981. This open letter to the American people concluded that "declines in educational performance are in large part the result of disturbing inadequacies in the way the educational process itself is often conducted." It was concluded that schools were not keeping pace with the need to prepare people to respond to the challenges of a rapidly changing world. Improvement was recommended particularly in the four aspects of the educational process of content, expectation, time, and teaching. Further, the commission concluded that "educational reform should focus on the goal of creating a learning society." At the heart of the learning society, as envisioned by the commission are educational opportunities extending into "every place where the individual can develop and mature in life and work."

Following the publication of *A Nation at Risk*, with its call for improvement in teaching and opportunities for lifelong learning, there has been increasing emphasis by educators on approaches to teaching emphasizing fostering problem solving skills. These approaches have been applied at various levels, such as in universities as well as preschools. However, these approaches, as well as other typical methods of instruction discussed above have the disadvantage of relying on trained teachers as well as on the student's prior knowledge and preparation. Further, methods developed from observations of child development may not work well for adults. For example, methods which tend to rely on physical interaction with, for example, the manipulatives of the Montessori method, or the objects of Piaget's developmental approach, are susceptible to not providing appropriate motivation for adults. Further, there remains a need for improvement in teaching, as evidenced by the recent publication of "An Educator's Guide to School Reform" by R. Hermann (American Institutes for Research, Wash., D.C., 1999).

Thus, there remains a need for a method of instruction that is adapted to address improvements in teaching as called for in *A Nation at Risk*, while not being dependent on prior student knowledge and teacher training, and that is suitable for both child and adult learning.

SUMMARY OF THE INVENTION

According to a preferred embodiment of the present invention, a method of instruction features a learning stage including presenting instructional material to a plurality of students; facilitating a discussion of the instructional material; and supervising a game relating to the instructional material. The instructional material is preferably self-contained. Further, the instructional material preferably includes at least one fact statement, more preferably in the form of a single sentence. The discussion step preferably includes arranging the students in small groups. Further, facilitating a discussion preferably includes allowing each student to address a plurality of questions regarding the instructional material. More preferably, these questions include "What does the instructional material say?"; "What does the instructional material mean to me?"; and "How do I apply the instructional material to my daily life?" The game preferably includes a quiz that includes at least one question. Further, a preferred rule of the game is that each student remains in the game until completion of the game. The method may optionally include an assessment stage, preferably to involving a quiz based on the material to be learned.

According to an alternative preferred embodiment of the present invention, a method of instruction features presenting information to a student, wherein the information is selected from a subject and is self-contained, such that it may be comprehended by the student without relying on prior knowledge within that subject; assigning the student to a small group having at least one other student; facilitating each student in addressing the meaning of the information; and allowing the participation of each student in a competitive game that reinforces the information, each student being retained in the game until its completion. The method may optionally further include assessing the student's retention of the information or pre-assessing the student's knowledge of the information before its presentation. Further, the game preferably includes a set of questions related to the information.

According to still an alternative embodiment of the present invention, a preferred method of doing business features preparing a self-contained instructional system and distributing the instructional system to an educational consumer. The instructional system includes a performance objective for the instructional system, an instructional material, a procedure for guiding at least one student in comprehending the content, meaning, and applicability of the instructional material, a game related to the instructional material, a pre-assessment related to the instructional material, and a post-assessment related to the instructional material. In a preferred embodiment, the educational consumer is a not-for-profit institution. Still more preferably, the not-for-profit institution is a church.

The preferred embodiments have the advantage that lecture-style presentation and active student participation in a small group may be combined. In this manner the preferred embodiments achieves advantages associated with both traditional transmission-based methods relying primarily on the teacher as the driving force and newer problem-based methods relying primarily on the student as the driving force. Further, students are provided with both motivation and reinforcement by involvement in a competitive game.

The preferred embodiments have the advantages that prior presenter training or student preparation are not required, the method involves independent modules which may be advanced through in any order, and the method is adapted to engage and motivate children, youth, and adults.

Thus, the present invention comprises a combination of features and advantages which enable it to overcome various problems of prior methods. The various characteristics described above, as well as other features, will be readily apparent to those skilled in the art upon reading the following detailed description of the preferred embodiments of the invention.

DETAILED DESCRIPTION OF THE PREFERRED EMBODIMENTS

A method of instruction according to a preferred embodiment of the present invention includes teaching a body of self-contained instructional material in a manner that motivates a student, or group of students, preferably by facilitating each student in playing a competitive game related to the instructional material. In addition to providing motivation and competition, the game preferably provides factors to the learning process including repetition and reinforcement of the instructional material. The method of instruction preferably includes the use of a curriculum module. The curriculum module is in a form that allows the method of instruction to be used by instructional personnel who require little to no training and by students who require no prior knowledge. Each curriculum module is independent.

The game that is used in the instructional method preferably includes a list of questions related to the instructional material, a list of rules, at least one question chooser, and a score sheet. The question chooser may be any question chooser as is known in the art of gaming, and the score sheet may be in any form that allows the score for each student to be tracked throughout the game. In a preferred embodiment, the game includes a plurality of question choosers that are chips, preferably circular, made of a hard material such as plastic, and from about 1 inch to 2 inches in diameter, and from about ⅛ to ¼ inch in thickness. Each chip is imprinted with a number. Enough chips are provided with the instructional material to cover the number of questions in the list of questions. Each chip has a different ordinal number. Preferably the numbers are sequential. In addition to exemplary rules as described below in Example 1, the rules preferably include a rule that each student remains in the game until the completion of the game. Thus, no student is eliminated, or equivalently, the game is non-eliminative. As the game is played, the students compete against each other by answering questions that are selected from the list of questions according to the rules of the game. The questions are preferably selected in a random order, for example by a student selecting a chip from a group of chips that have their numbers not visible. The game also includes a list of answers to the questions. In a preferred embodiment, the list of questions is the same as the list of questions in the pre/post assessment. The playing of the game serves to reinforce the instructional material presented in the lesson.

The instructional material contained in a lesson according to a preferred embodiment is preferably self-contained. Further the instructional material preferably includes a body of information, preferably in the form of a list of statements. Each statement is preferably concise. In particular, each statement is preferably in the form of a single sentence. Further, each statement is preferably factual. It is an advantage of the instructional material that it eliminates the necessity of the teacher preparing most of the instructional material. The use of the method simplifies the presentation of the instructional material, allowing the presenter to have freedom to focus on assisting the student in understanding and applying the material. Although the presenter may be a trained teacher, the presenter need not have prior training and may be a self-study student or one of the students in a group of students. Further, the instructional material allows the student to have freedom to focus on learning the material at an individual pace, without being dependent on the presenter. Modules of instructional material contain one or more lessons about one or more subjects.

In one preferred embodiment, the instructional material relates to a Judeo-Christian Bible. Exemplary material from a lesson according to such a curriculum is described below.

A curriculum module is preferably in the form of written material. The written material may be recorded on any conventional medium. For example, mechanical media include paper, cardboard, and the like. Electromagnetic media, such as for use with an electronic device, such as a video player or a computer, include audio tape, video tape, floppy disk, compact disk, memory chip, and the like. The material may be made available in mechanical form or distributed electronically, for example on an internet site. In a preferred embodiment, the instructional material is contained in a volume, such as a binder that contains sheets of hole-punched paper, preferably organized with dividers. Each sheet contains a portion of the written material. The binder may also include a zippered pouch that holds articles for the game, such as a timer and question choosers, described in more detail below. The volume includes at least one module. Each module includes at least one lesson.

Each lesson, which may be referred to as an instructional system, preferably includes individual components designed to each relate to the instructional material in that lesson. For example, components may be chosen from, but are not limited to, a purpose, a performance objective, a lesson plan, an instructional material, a game, a pre/post assessment, a student assessment, and a procedure designed to guide the student in comprehending the content, meaning, and applicability of the instructional material, which may be referred to as a kwik-prehension, or equivalently a comprehension guide. Preferably, the lesson includes at least the instructional material, a kwik-prehension related to the instructional material, and a game related to the instructional material. The performance objective includes a list of preferred tasks for the student to accomplish once the lesson is completed. The lesson plan includes a list of preferred tasks for the presenter to include while presenting the instructional material contained in the lesson. The game elements include a quiz that includes a list of preferred questions on the instructional material contained in the lesson for the student to be able to answer once the module is completed. The game further includes a list of rules. The pre-assessment and the post-assessment each includes a quiz for that assessment including a list of questions designed to assess how much, if any, of the instructional material contained in the statements is known before/after completing the lesson. The game quiz, the pre-assessment quiz, and the post-assessment quiz may all be a single quiz. Alternatively, the pre-assessment questions, or the post-assessment questions may be the same as the game quiz questions, but presented in a different order. This has the advantage that the students are less able to memorize the answers. Still alternatively, each quiz may include different questions on the same instructional material. The student assessment includes an evaluation form that allows the students to express their opinions about the lesson and its components and to provide the presenter with feedback.

The method of instruction is adapted to be used to teach a large range of class sizes, for example from a single student to classes of 100–300 people or more. Instructional personnel preferably include a presenter and assistants. The number and role of assistants will vary with the number and level of students. Preferably, in application of the method of instruction to a group of more than about 10 students, the presenter assigns each student to a small group, preferably of 8–12 people, more preferably 10 people. Assistants include a plurality of coordinators, preferably 2–5, who assist the presenter, and a plurality of monitors, who conduct the small groups. A monitor may be one of the students, as may the coordinator, or the presenter, depending on the number of students. However, it is preferred that the presenter supervising, or facilitating, the playing of the game, not be one of the students.

The presenter presents the instructional material. Such presentation may be in the form of a lecture. Prior to presenting the instructional material, the presenter may modify the instructional material to accommodate student factors, such as age and grade level. Further, the presenter performs other tasks designed to assist the students in learning the instructional material. Such tasks may include arranging the students in small groups, allowing the students to respond to the kwik-prehension questions, allowing the students to participate in the game, responding to student questions, issuing each student a post assessment, and issuing each student a student assessment. The presenter preferably conducts at least one session covering the lesson. A lesson may be the subject of two or more sessions, which may occur on different days. These activities are exemplary and not limiting.

A coordinator performs tasks to assist the presenter and oversee the monitors, as required or requested. For example, the coordinator may assist the presenter by assessing the effectiveness of the training sessions and the instructional material, reviewing and summarizing the student assessments and submitting the summaries to the presenter, and meeting with the presenter to discuss a training session, preferably immediately following the training session. Further, the coordinator may oversee the monitors by assigning monitors to groups, meeting with and briefing the assigned monitors prior to each training session, reviewing and verifying post assessment scores that are turned in by the monitors. The activities described above are exemplary and not limiting. Further, if the class size is small enough, for example having no more than 3–5 groups, the role of the coordinator may be performed by the presenter.

A monitor facilitates the activities of a small group and reports to one of the coordinators. One monitor is assigned for each small group. The monitor may be selected from among the students. The monitor may facilitate the activities of the assigned small group by conducting the comprehension sessions, monitoring the game, providing, collecting, and scoring the post assessments for each student, and providing, collecting and summarizing the student assessments. The monitor may report to the coordinator by meeting with the coordinator before each training session, by submitting post assessment scores and a summary of the student assessments, and by relaying to and discussing with the coordinator any positive or negative feedback that students in the small group may offer to the monitor. These activities are exemplary and not limiting. Further, if the class size is small enough, for example, having no more than the size of one small group, the role of the monitor may be performed by the presenter.

An exemplary first session according to a preferred embodiment includes the following tasks. The presenter performs a first, second, third, and fourth step, each allotted a portion of time, for example 45, 30, 30, and 15 minutes, respectively. The first step includes presenting the instructional material. The second step includes arranging the students in small groups, and facilitating a discussion of the instructional material, such as by allowing the students to respond to the questions listed in the kwik-prehension. One third of the time preferably is allotted to each of three questions. The questions, taken from the kwik-prehension include, for example, "What does the instructional material say?", "What does the instructional material mean?", and "How can the instructional material be applied?". The third step includes allowing the students to participate in the game, preferably supervising each student in participating in the game, played according to the rules described in the game component of the lesson. The fourth step includes concluding the session by answering any student questions, such as about the discussion, telling the student the plan for the next session, and instructing the students to review the instructional material and the questions contained in the quiz before the next session. It is preferred that at least one session include at least the presentation, discussion, and game.

An exemplary second session according to a preferred embodiment includes the following tasks. The presenter performs a first, second, third, and fourth step, each allotted a portion of time, for example 30, 30, 30, and 30 minutes, respectively. The first step includes presenting again, or reviewing, the instructional material. The second step includes arranging the students in the same small groups they were in for the first session, and facilitating further discussion by allowing them to continue the discussion of the instructional material, by responding to the above described questions. The third step includes supervising the students in playing the game according to the rules set forth in the lesson. The fourth step includes issuing each student a post assessment and student assessment to complete. Preferably ⅔ of the time allotted for the fourth step is allotted for completing the post assessment and ⅓ of the time allotted for the fourth step is allotted for completing the student assessment.

It is understood that, in each of the above descriptions of an exemplary session, the order in which the activities of presentation, discussion, and game occur, is exemplary and not limiting. Further, any one of those activities may be omitted from a lesson, or another activity may be added. Still further, it is understood that the presenter may vary the time allotted to each activity. Advantages of the preferred instructional method are flexibility and versatility.

In conjunction with the use of a preferred embodiment of the instructional method, it is preferred that the instructional material, in any aspect as described above or below, be developed by an educational expert or a collection of educational experts, and provided to the presenter. An educational expert may be any suitably qualified person, such as a trained teacher, a certified teacher, a recipient of an Ed.D. or other advanced educational degree, a university education instructor or professor, and the like. Thus, a preferred method of preparing the instruction material includes developing a self-contained curriculum module and distributing the curriculum module to an educational consumer. A method of preparing an instructional material is preferably a method of doing business.

The preparation of the curriculum module preferably includes identifying the core material of a subject that it is preferred that the student learn and retain. Further, the preparation preferably includes extracting the core material from material on the subject. According to a preferred embodiment, the expert, or other qualified preparer, selects the instructional material based on the desired learning, as for example the performance objectives such as described above. For example, the preparer may perform activities such as selecting a body of information, extracting core information from the body of information, formulating questions based on the core information that the students are to be able to answer, and preparing fact statements associated with the questions.

The curriculum module may be any of the curriculum modules described herein. The curriculum module may include one or more instructional systems as described herein. It is preferred that the curriculum module be self-contained and include only the material that is to be tested. Further, it is preferred that the curriculum module be simple, and adapted to quick and easy learning. The curriculum module preferably includes at least one lesson that includes a plurality of independent statements, a small group discussion guide related to the statements, and a game related to the statements.

The educational consumer may be selected from among a self-study student, a home-schooling instructor, such as parent, guardian or tutor of a child, a not-for-profit institution, or a for profit institution. Representative for-profit institutions include a company, a corporation, and a small business. Representative not-for-profit institutions include a school, such as an academic school, or a trade school, and a church. In a preferred embodiment, the educational consumer is a not-for-profit institution. Still more preferably, the not-for-profit institution is a church. A church is here defined as a congregation that regularly assembles together in the same place for worship. More particularly, the congregation includes at least one voting member of the congregation.

The preferred methods of instruction and of preparing the instructional material have various advantages that include but are limited to the following.

Discussion of the instructional material in the form of fact statements focuses students on discussing facts. An element of the discussion may include opinion, such as in addressing the question, "What do the facts mean to me?" However, it is preferred that the discussion open with a review of the facts, such as addressing the question, "What are the facts." An advantage of additionally addressing the meaning of the facts is that rote memorization of the facts is discouraged and application of the facts is encouraged.

Use of a self-contained curriculum module equalizes students, since prior knowledge on the part of a student is not required. This contrasts with instruction based on prior knowledge. For example, a sequential instructional method puts unprepared students at a disadvantage.

Further, use of a prepared lesson plan for the instructional material guides the presenter in the tasks to be accomplished. Thus, the presenter is less apt to manipulate a student than when the presentation of material is less structured.

Still further, through use of self-contained instructional materials, self-contained lessons, and self-contained curriculum modules, the instructional method is adapted to non-sequential presentation of the instructional materials. Thus, the instructional materials may be presented in any order, without a required sequence. For example, the order may be scrambled.

It is understood that the presentation of the instructional material may include a variety of divisions of presenter and student tasks. For example, the presenter may tell the students to read the statements in the instructional material. Alternatively, the presenter may read the statements. Further, the presenter may elaborate on the statements. However, in assessing the retention of the statements, the presenter does not test on the elaboration. Assessment is preferably directed to no more than the content of the statements.

It is understood that a preferred curriculum module may be used by students of any age. If the module is to be used in instructing a student who does not read, such as a small child, it is preferred that the presentation be made by a non-student presenter who presents the instructional material in the curriculum module verbally.

The material in each of the following examples is protected by copyright to Miracle Publications International. Trademark protection has been sought for the indicated marks.

EXAMPLE 1

GAME RULES

1. The Monitors arrange the students into groups of 10 or less.
2. The Monitor, who conducts the game according to these rules, writes the name of each student on the KWIK SCORE™, and each time a student answers a question correctly, his score is marked to record the number of points he has scored.
3. Before the game begins, the Monitor removes the KS chips that will not be used in the game. For example, if the KWIK-E-KWIZ™ has only 20 questions, the Monitor will remove KS chips 21–50 and place only numbers 1–20 and the two bonus chips on the table. Once the chips are placed on the table with the KS visible on all of the chips, each student is allowed to select a chip; the student who selects the chip with the highest number is given a chance to answer the first question.
4. The game consists of three rounds; each round is played until the 10-minute time limit is up or until a student scores 200 points, whichever comes first.
5. Each student must select a number (chip) when it is his turn to answer a question and he must attempt to answer the question that corresponds to the number selected. Once a student selects a number, the Monitor reads the question from the KWIK-E-KWIZ™ that corresponds to the number selected.
6. Once a student has given his answer to a question, the student to his immediate right is given a chance to select a number (chip) and answer a question.
7. If a question is not answered correctly, the next student may attempt to answer it; if the question is answered correctly, the student may select a second chip and attempt to answer a second question.
8. Two of the KS chips are bonus chips, which must always be included with the other chips whenever the game is played. When a student selects a bonus chip, he has five chances to answer five questions, even if none of the questions is answered correctly.
9. Each correct answer is worth 20 points. All questions must be answered within twenty seconds. The student scoring the most points within the 10-minute time limit or the student who scores 200 points within the 10-minute time limit is declared the winner of the round. The student who wins two rounds is declared the winner of the game. If no student wins two rounds, the student with the highest accumulative score at the end of the third round is declared the winner of the game.
10. The Monitor must use the answer sheet in determining if a question has been answered correctly. While an answer does not have to be verbatim to what appears on the answer sheet in order for it to be correct, the Monitor must rule that it is an acceptable answer before it can be considered correct.

EXAMPLE 2

INSTRUCTIONAL MATERIAL—THE GODHEAD

1. The Bible teaches that God is one, but He is manifested in three persons—the Father, the Son, and the Holy Spirit (Matthew 3:16–17).
2. The Bible teaches that God is the creator of all things and is the sustainer of all things (Genesis 1:1; Acts 17:28).
3. The Bible teaches that God is omnipresent—present everywhere (Jeremiah 23:23–24); He is omniscient—knows all things (Psalms 139:1–4); and He is omnipotent—all—powerful (Jeremiah 32:17).
4. The Bible teaches that God is love (1 John 4:8).
5. The Bible teaches that God loves man unconditionally (John 3:16; Romans 5:8).
6. The Bible teaches that God is a God of grace (Ephesians 2:8).
7. The Bible teaches that God's mercies are new every morning (Lamentations 3:22–23).
8. The Bible teaches that " . . . for he that cometh to God must believe that He is, and that He is a rewarder of them that diligently seek Him" (Hebrews 11:6).
9. The Bible teaches that "God is a Spirit and they that worship Him must worship Him in spirit and in truth" (John 4:24).
10. The Bible teaches that God is a person who has personal names and attributes. For example, God is referred to as (a.) Jehovah Elohim—the strong and mighty one who creates all things (Genesis 2:4); (b.) Jehovah Jireh—God will provide (Genesis 22:14); (c.) Jehovah Rapha—the God that heals (Exodus 15:26); and (d.) Jehovah Shalom—God is peace (Judges 6:24).
11. The Bible teaches that Jesus, the second person of the Godhead, is the Son of God and has existed with the Father from the beginning (John 1:1, 14, 18).
12. The Bible teaches that Jesus was the Word that became flesh: "And the Word was made flesh, and dwelt among us . . . " (John 1:14).
13. The Bible teaches that Jesus became flesh and lived on earth for approximately 33 years (Luke 3:21–23).
14. The Bible teaches that Jesus was crucified for our sins, buried, resurrected, and ascended into heaven where He now sits at the right hand of God making intercessions for us (Romans 5:8; 8:34; 10:9–10; 1 Corinthians 15:17).

15. The Bible teaches that Jesus is the role model we should follow when it comes to our attitudes towards each other. (Philippians 2:5–8 TLB).
16. The Bible teaches that Jesus is God's answer to the sin problem (John 3:16–17; 2:21; 4:12).
17. The Bible teaches that no one can come to the Father but through Jesus (John 14:6).
18. The Bible teaches that "God anointed Jesus of Nazareth with the Holy Ghost (Spirit) and with power: who went about doing good, and healing all that were oppressed of the devil; for God was with him" (Acts 10:38).
19. The Bible teaches that the name of Jesus is the most powerful name there is in all of creation (Philippians 2:9–11).
20. The Bible teaches that Jesus will return to the earth a second time (John 14:3; Revelation 22:7,12).
21. The Bible teaches that the third person of the Godhead is the Holy Spirit (Genesis 1:26; Matthew 28:19).
22. The Bible teaches that the Holy Spirit is a person not a ghost; therefore, he should never be referred to as it or a thing (John 15:26).
23. The Bible teaches that the Holy Spirit is the only member of the Godhead currently present in the earth realm. He executes the Will of God and glorifies Jesus (John 14:16; 15:26).
24. The Bible teaches that the Holy Spirit is also available to assist believers in carrying out God's plans and purposes for their lives (John 14:26 AB).
25. The Bible teaches that the Holy Spirit empowers believers with spiritual gifts (1 Corinthians 12:4–11, 28; Romans 12:4–8).
26. The Bible teaches that when a believer is filled with or baptized in the Holy Spirit, he has supernatural power that other believers do not have (Acts 1:5,8; 10:38; Matthew 3:16–17; Luke 4:1,18,19).
27. The Bible teaches that Jesus did nothing worthy of note until he was filled with or baptized in the Holy Spirit (Matthew 3:16,17; Luke 4:1,18,19; Acts 10:38).
28. The Bible teaches that the purpose of the Holy Spirit is to help the believer, not to control him (John 14:26; 1 Corinthians 14:32,33).
29. The Bible teaches that being filled with or baptized in the Holy Spirit happens after a person is born again (Acts 1:8; 8:14–17; 19:1–6).
30. The Bible teaches that the same divine attributes used in describing God are also used to describe the Holy Spirit. The following are several examples: eternal (Hebrews 9:14); omniscience (1 Corinthians 2:10–11); omnipresence (Psalms 139:7–10); omnipotence (Luke 1:35; Acts 10:38); holiness (Romans 1:4); love Galatians 5:22–23).
31. What the Bible teaches about the Godhead is perhaps best summarized in the Apostles' Creed, which is a constant reminder that God is One, but He expresses Himself as three distinct persons:

I believe in God, the Father Almighty, Creator of heaven and earth. I believe in Jesus Christ, His only Son, our Lord He was conceived by the power of the Holy Spirit and was born of the Virgin Mary. He suffered under Pontius Pilate, was crucified, died, and was buried He descended to the dead On the third day He rose again. He ascended into heaven and is seated at the right hand of the Father. He will come again to judge the living and the dead I believe in the Holy Spirit, the forgiveness of sins, the resurrection of the body, and the life everlasting. Amen.

32. This creed has long been a vital part of the church's tradition, as have these words of benediction: "The grace of the Lord Jesus Christ, and the love of God, and the communion of the Holy Ghost (Spirit) be with you all. Amen. (2 Corinthians 13:14)

EXAMPLE 3

QUIZ QUESTIONS AND ANSWERS—THE GODHEAD

| | |
|---|---|
| 1. Who does the Bible teach is one? | (1) |
| 2. Into how many persons does the Bible say God manifests Himself? | (1) |
| 3. Into what three persons does the Bible say God manifests Himself? , , | (1) |
| 4. Who does the Bible say is the creator of all things? | (2) |
| 5. What does it mean to say God is omnipresent? | (3) |
| 6. What does it mean to say God is omniscient? | (3) |
| 7. What does it mean to say God is omnipotent? | (3) |
| 8. The Bible teaches that is love. | (4) |
| 9. How does the Bible say God loves man? | (5) |
| 10. The Bible teaches that God is a God of . | (6) |
| 11. What does the Bible say about God that is new every morning? | (7) |
| 12. Of whom does the Bible say God is a rewarder? | (8) |
| 13. The Bible teaches that God is a Spirit, and they that worship Him must do what? | (9) |
| 14. List the first two names of God and what they mean as they appear in the Kwik Facts. | (10) |
| 15. List the last two names of God and what they mean as they appear in the Kwik Facts. | (10) |
| 16. Who does the Bible say is the second person of the Godhead? | (11) |
| 17. What does the Bible teach that Jesus did with the Father from the beginning? | (11) |
| 18. The Bible teaches that Jesus was the Word that became what? | (12) |
| 19. How long did Jesus live on the earth? | (13) |
| 20. What does the Bible say Jesus is doing at the right hand of God? | (14) |
| 21. What does the Bible say we should do when it comes to our attitudes towards each other? | (15) |
| 22. What does the Bible say Jesus is God's answer to? | (16) |
| 23. The Bible teaches that no one can come to the Father but by whom? | (17) |
| 24. What does the Bible say God did to Jesus with the Holy Ghost and with power? | (18) |
| 25. What name does the Bible teach is the most powerful in all creation? | (19) |
| 26. Does the Bible teach that Jesus will return a second time? | (20) |
| 27. Who does the Bible say is the third person of the Godhead? | (21) |

28. The Bible says the Holy Spirit is a person; therefore, he should not be referred to as what? (22)

29. Who does the Bible say is the only member of the Godhead currently present in the earth realm? (23)

30. The Bible says the Holy Spirit is available to assist the believers to do what? (24)

31. The Bible teaches that the Holy Spirit empowers believers with what? (25)

32. When a believer is filled with or baptized with the Holy Spirit, what does he have that other believers do not have? (27)

33. Jesus did nothing of note until what happened to Him? (28)

34. The Bible teaches that the purpose of the Holy Spirit is to do what for the believer? (29)

35. The Bible teaches that being filled with the Holy Spirit happens after what has happened to a person? (30)

36. What does the Bible say is used to describe the Holy Spirit? (31)

37. What is the name of the creed that best summarizes what the Bible teaches about the Godhead? (32)

38. What is the Apostle's Creed a constant reminder of? (32)

39. What does the benediction in 2 Corinthians 13:14 say? (33)

ANSWERS

1. God
2. Three
3. The Father, the Son, and the Holy Spirit
4. God
5. He is present everywhere
6. He knows all things
7. He is all powerful
8. God
9. Unconditionally
10. Grace
11. His mercies
12. Them that diligently seek Him
13. Worship Him in spirit and in truth
14. Jehovah Elohim—the strong and mighty one who creates all things.
    Jehovah Jireh—God will provide.
15. Jehovah Rapha—the God that heals.
    Jehovah Shalom—God is peace.
16. Jesus
17. Existed
18. Flesh
19. Approximately 33 years
20. Making intercessions for us
21. Follow Jesus as our role model
22. The sin problem
23. Jesus
24. Anointed Him
25. The name of Jesus
26. Yes
27. The Holy Spirit
28. An "it" or a "thing"
29. The Holy Spirit
30. To carry out God's plans and purposes for their lives
31. Spiritual gifts
32. Supernatural power
33. He was filled or baptized with the Holy Spirit.
34. Help, not control
35. He is born-again
36. The same divine attributes used in describing God
37. Apostle's Creed
38. That God is One
39. "The grace of the Lord Jesus Christ and the love of God, and the communion of the Holy Spirit be with you all. Amen."

While preferred embodiments of this invention have been shown and described, modifications thereof can be made by one skilled in the art without departing from the spirit or teaching of this invention. The embodiments described herein are exemplary only and are not limiting. Many variations and modifications of the system and method are possible and are within the scope of the invention. Accordingly, the scope of protection is not limited to the embodiments described herein, but is only limited by the claims which follow, the scope of which shall include all equivalents of the subject matter of the claims.

What is claimed is:

1. A method of instruction having a self-contained instructional system, the method comprising:
    selecting instructional material containing facts on a given subject whereby the instructional material is self-contained requiring no prior knowledge by a student of the facts; and
    presenting the facts of the instructional material to at least one student according to a lecture format, the presentation being conducted by a non-student presenter:
        facilitating a discussion of the facts of the instructional material with each student addressing a plurality of comprehension questions regarding the facts; and
        after completing the presenting of the facts, supervising a game on the facts of the instructional material contained in the instructional system and reinforcing the facts of the instructional material.

2. The method according to claim 1, wherein said selecting comprises selecting said instructional material so as to be independent of another instructional material.

3. The method according to claim 1, wherein said presenting comprises selecting said instructional material such that it comprises at least one fact statement.

4. The method according to claim 3, wherein said selecting comprises selecting said statement such that it is in the form of a plurality of sentences.

5. The method according to claim 1, wherein said selecting comprises selecting said statement such that it is in the form of a single sentence.

6. The method according to claim 1, wherein said facilitating comprises arranging a plurality of students in at least one small group.

7. The method according to claim 1, wherein said facilitating comprises selecting at least one of said questions so as to comprise:
    "What does the instructional material say?".

8. The method according to claim 1, wherein said facilitating comprises selecting at least one of said questions so as to comprise:
    "What does the instructional material mean to me?".

9. The method according to claim 1, wherein said facilitating comprises selecting at least one of said questions so as to comprise:
    "How do I apply the instructional material to my daily life?".

10. The method according to claim 1, wherein said supervising comprises selecting the game such that it comprises at least one question which reinforces at least one fact statement from the instructional material.

11. The method according to claim 1, wherein said supervising comprises selecting said game such that it comprises a rule that each student remains in the game until completion of the game.

12. The method according to claim 1 wherein said presenting comprises reading said instructional material and elaborating on said instructional material.

13. The method according to claim 1 wherein said presenting comprises presenting said instructional material to at least 100 students and wherein said supervising comprises supervising a plurality of games, each played by a subgroup comprising from 8 to 12 of said students.

14. The method according to claim 1 further comprising a second learning stage conducting according to a second instructional system independent of the first instructional system.

15. An instructional method, comprising:
(a) teaching a self-contained instructional material to a plurality of students according to a lecture format, the instructional material containing facts on a given subject requiring no prior knowledge on the part of each of said students of the facts, and contained in a self-contained instructional system further comprising a game reinforcing the instructional material and a comprehension guide relating to the instructional material; wherein step (a) is conducted by a non-student presenter; and
wherein step (a) comprises:
(a1) presenting the instructional material to said students; and
(a2) guiding said students to address at least one of the content, meaning, and applicability of the instructional material according to said comprehension guide; and
(a3) after completing step (a1), supervising participation in the game.

16. The method according to claim 15, wherein said teaching further comprises selecting said instructional system so as to further comprise a lesson plan and wherein said presenting further comprises presenting said instructional material according to said lesson plan.

17. The method according to claim 15, wherein said teaching further comprises selecting said game so as to contain a list of questions and a set of rules comprising and wherein said supervising further comprises allowing said students to randomly and repetitively address at least one question contained in the list of questions.

18. The method according to claim 15, wherein said teaching further comprises selecting said game so as to contain a list of questions and a set of rules comprising and wherein said supervising further comprises allowing said students to competitively and non-eliminatively address at least one question contained in the list of questions.

19. The method according to claim 15 wherein said presenting comprises reading said instructional material and elaborating on said instructional material.

20. The method according to claim 15 wherein said presenting comprises presenting said instructional material to at least 100 students and wherein said supervising comprises supervising a plurality of games, each played by a subgroup comprising from 8 to 12 of said students.

21. An instructional method, comprising:
a) selecting a self-contained lesson comprising information selected from a subject and a competitive game reinforces the information;
b) presenting the information to a plurality of students according to a lecture format, wherein the information is self-contained, such that it may be comprehended by each student independently of the student's prior knowledge within that subject; and
c) assigning the student to a small group having at least one other student;
d) facilitating each student in addressing at least one of the content, meaning, and applicability of the information; and
e) after completing step (b), allowing the participation of each student in the competitive game, each student being retained in the game until its completion, wherein the method is conducted by a non-student presenter.

22. The method according to claim 21, further comprising assessing the student's retention of the information.

23. The method according to claim 21, further comprising pre-assessing the student's knowledge of the information before step a).

24. The method according to claim 21, wherein step (e) comprises selecting the game such that it includes a set of questions related to the information.

25. The method according to claim 21, wherein said presenting comprises reading said instructional material and elaborating on said instructional material.

26. The method according to claim 21 wherein said presenting comprises presenting said instructional material to at least 100 students and wherein said supervising comprises supervising a plurality of games, each played by a subgroup comprising from 8 to 12 of said students.

27. An instructional system for teaching a student comprising:
a self-contained instructional material comprising a body of factual information selected from a subject and independent of prior knowledge on the part of the student in the subject; and
a game comprising:
a corresponding list of factual questions reinforcing said instructional material; and
a rule that students randomly address questions contained in the list;
wherein said instructional system in self-contained.

28. The instructional system according to claim 27 further comprising:
a lesson plan containing instructions for presenting said instructional material.

29. The instructional system according to claim 27 further comprising:
a comprehension guide containing questions for guiding students in comprehending said instructional material.

30. The instructional system according to claim 27 further comprising:
a pre-assessment comprising a list of questions related to the instructional material and adapted for assessing the prior knowledge of at least one student of the content of the instructional material.

31. The instructional system according to claim 30 further comprising:
a post-assessment comprising a list of questions related to the instructional material and adapted for assessing the retention of at least one student of the content of the instructional material, wherein the post-assessment contains the same questions as the pre-assessment.

32. The instructional system according to claim 27 further comprising:
a post-assessment comprising a list of questions related to the instructional material and adapted for assessing the retention of at least one student of the content of the instructional material.

* * * * *